United States Patent [19]

Bengio et al.

[11] Patent Number: 6,128,606
[45] Date of Patent: Oct. 3, 2000

[54] MODULE FOR CONSTRUCTING TRAINABLE MODULAR NETWORK IN WHICH EACH MODULE INPUTS AND OUTPUTS DATA STRUCTURED AS A GRAPH

[75] Inventors: Yoshua Bengio, Montreal, Canada; Leon Bottou, Highlands; Yann Andre LeCun, Lincroft, both of N.J.

[73] Assignee: AT&T Corporation, New York, N.Y.

[21] Appl. No.: 08/815,504

[22] Filed: Mar. 11, 1997

[51] Int. Cl.[7] .................................................... G06F 15/00
[52] U.S. Cl. ................................ 706/10; 706/12; 706/14
[58] Field of Search ................................ 706/14, 10, 45, 706/12, 15, 16, 20, 25

[56] References Cited

U.S. PATENT DOCUMENTS

| 4,713,778 | 12/1987 | Baker | 704/254 |
|---|---|---|---|
| 4,829,450 | 5/1989 | Manthey | 706/62 |
| 5,067,165 | 11/1991 | Nishida | 382/195 |
| 5,430,744 | 7/1995 | Fettweis et al. | 714/795 |

OTHER PUBLICATIONS

Yann Le Cun et al. "Word–Level Training of a Handritten Word Recognizer Based on Convolutional Neural Networks," Proceedings of the IAPR International Conference on Pattern Recognition, Oct. 1994, pp. 88–92.

S. Osowski et al., "Application of SFG in Learning Algorithms of Neural Networks," Proceedings of the International Workshop on Neural Networks for Identification, Control, Robotics, and Signal/Image Processing, Aug. 1996, pp. 75–83.

Yann Le Cun et al. Word–Level Training of a Handritten Word Recognizer Based on Convolutional Neutral Networks, Proceedings of the IAPR International Conference on Pattern Recognition, Oct. 1994, pp. 88–92.

Lou Zhensheng et al. The Parallel Model for Syntax Analysis with Uniform Graph Transformation Mechanism, Proceedings of the 3rd Pacific RIM International Conference on Artificial Intelligence, Aug. 15, 1994, pp. 649–657.

*Primary Examiner*—Tariq R. Hafiz
*Assistant Examiner*—Jason W. Rhodes
*Attorney, Agent, or Firm*—Kenyon & Kenyon

[57] ABSTRACT

A machine learning paradigm called Graph Transformer Networks extends the applicability of gradient-based learning algorithms to systems composed of modules that take graphs as inputs and produce graphs as output. Training is performed by computing gradients of a global objective function with respect to all the parameters in the system using a kind of back-propagation procedure. A complete check reading system based on these concept is described. The system uses convolutional neural network character recognizers, combined with global training techniques to provides record accuracy on business and personal checks.

35 Claims, 7 Drawing Sheets

MODULE FOR CONSTRUCTING TRAINABLE MODULAR NETWORK IN WHICH EACH MODULE INPUTS AND OUTPUTS DATA STRUCTURED AS A GRAPH

BACKGROUND OF THE INVENTION

The present invention relates generally to modular networks and processes, and more particularly to a modular process in which each module receives data and outputs data that is structured as graphs.

Systems designers build complex systems for performing tasks, such as document processing, by first partitioning the task into manageable subtasks. In the case of document processing systems, some of these subtasks include field detection, word segmentation, and character recognition. After the task is partitioned, separate modules are built for each subtask. To build the system, one needs to specify the inputs and outputs of each module. Typically, each module is then trained, or manually optimized, outside of its context, i.e., without being connected to the remaining modules in the system. This often requires manually creating the input and output "data" for each module, in particular the intermediate modules, so that the module can be trained appropriately. After the complete system is assembled, a subset of the parameters of each of the modules is manually adjusted to maximize the overall performance. Determining the appropriate subset can be difficult, and often this final step can be extremely tedious, and time-consuming. Consequently, this design process often leads to suboptimal results. In fact, large trainable networks are often not practical for many real world applications due to the severe complexity in training them.

An example of the relationship between an intermediate module and the rest of the system can be understood with reference to a character recognition system. For example, a character recognition module can be trained to recognize well-formed individual characters. However, the role of the recognizer in the context of the entire system is usually quite different than simply recognizing the characters. Very often, character recognizers are expected to also reject badly segmented characters and other non-characters. They are also expected to produce reliable scores that can be used by a post-processor, such as a statistical language model. For example, if the task is to read the amount on a bank check, the overall or global objective function that must be minimized is the percentage of checks that must be rejected in order to attain a given error rate on the accepted checks. Merely training the character recognizer module to minimize its classification error on individual characters will not minimize the global objective function. Ideally it is desirable to find a good minimum of the global objective function with respect to all of the parameters in the system.

Furthermore, creating the intermediate data on which the module is to learn can be quite a task in and of itself Often these modules perform relatively simple functions but do so on a large amount of data, which requires a large amount of data on which to learn. In some cases, the intermediate data is not easily determined. Consequently, in most practical cases, this optimization problem appears intractable, which to date has limited the types of problems to which large trainable networks have been applied.

Another problem facing network designers consists of the ability of modules to appropriately structure data and represent the state of the module in a way that best represents the problem being solved. Traditional multi-layer neural networks can be viewed as cascades of trainable modules (e.g., the layers) that communicate their states and gradients in the form of fixed-size vectors. The limited flexibility of fixed-size vectors for data representation is a serious deficiency for many applications, notably for tasks that deal with variable length inputs (e.g. speech and handwriting recognition), or for tasks that require encoding relationships between objects or features whose number and nature can vary (such as invariant perception, scene analysis, reasoning, etc.).

Convolutional network architectures, such as Time Delay Neural Networks (TDNN) and Space Displacement Neural Networks (SDNN) as well as recurrent networks, have been proposed to deal with variable-length sequences of vectors. They have been applied with great success to optical character recognition, on-line handwriting recognition, spoken word recognition, and time-series prediction. However, these architectures still lack flexibility for tasks in which the state must encode more than simple vector sequences. A notable example is when the state is used to encode probability distributions over sequences of vectors (e.g., stochastic grammars).

In such cases, the data are best represented using a graph in which each arc contains a vector. Each path in the graph represents a different sequence of vectors. Distribution over sequences can be represented by interpreting parts of the data associated with each arc as a score or likelihood. Distributions over sequences are particularly handy for modeling linguistic knowledge in speech or handwriting recognition systems: each sequence, i.e., each path in the graph, represents an alternative interpretation of the input. Successive processing modules progressively refine the interpretation. For example, a speech recognition system starts with a single sequence of acoustic vectors, transforms it into a lattice of phonemes (i.e., a distribution over phoneme sequences), then into a lattice of words (i.e., a distribution over word sequences), then into a single sequence of words representing the best interpretation. While graphs are useful, systems designers have not been able to employ them in modular format to solve complex problems due to the difficulty in training these types of systems. It is particularly difficult to create the intermediate forms of data for the intermediate modules when using data structured as graphs.

The present invention is therefore directed to the problem of developing a modular building block for complex processes that can input and output data in a wide variety of forms, but when interconnected with other similar modular building blocks can be easily trained.

SUMMARY OF THE INVENTION

The present invention solves this problem by using a graph transformer as a basic modular building block, by using differentiable functions in each module to produce numerical data attached to an output graph from numerical data attached to an input graph and from any tunable parameters within the module, and by training a network of these modules by back-propagating gradients through the network to determine a minimum of the global objective function. In this case, the differentiable functions are differentiable with respect to the inputs as well as the tunable parameters, if any.

According to another aspect of the present invention, a network of cascaded modules includes a plurality of graph transformers. Each graph transformer has an input receiving a first graph, an output outputting a second graph, and an internal function producing data in the second graph from data in the first graph, wherein said plurality of graph transformers includes at least one tunable graph transformer having at least one tunable parameter being used to produce data in the second graph from data in the first graph of the tunable graph transformer, the internal function of each of the plurality of graph transformers is differentiable with respect to data in the first graph, and the internal function of the at least one tunable graph transformer is also differentiable with respect to the at least one tunable parameter. The network also includes a back-propagation phase that back propagates gradients through the network to determine a minimum of a global objective function.

According to an advantageous embodiment of the present invention, the back-propagation phase determines the minimum of the global objective function by: a) calculating a gradient of the global objective function with respect to the tunable parameters by back-propagating gradients through the network; b) adjusting the at least one tunable parameter in each module based on the calculated gradient of the global objective function; and c) repeating steps a) and b) until reaching the minimum of the global objective function. In this case, the minimum can be defined as when reaching the theoretical minimum, when the change in the gradient falls below some predetermined threshold, when the objective function measured on a different set of training examples stops decreasing, or any other stopping criterion commonly used in machine learning. In this embodiment of the present invention, there are many ways to adjust the tunable parameters, such as merely decrementing the tunable parameter by the calculated gradient. Another method is to decrement the tunable parameter by an amount equal to the gradient multiplied by a positive constant (known as the learning rate or step size). Other more complex algorithms can also be used, such as the conjugate gradient, Newton, and adaptive step size algorithms.

According to another aspect of the present invention, a method for optimizing a network being composed of a plurality of graph transformation modules includes the steps of: a) providing that a function performed by each graph transformation module is differentiable almost everywhere with respect to any internal parameters of the graph transformation module and with respect to one or more inputs of the graph transformation module; and b) training the network by computing a minimum of a global objective function of the network with respect to any internal parameters of each of the graph transformation modules using a back-propagation procedure.

According to another aspect of the present invention, in a network composed of a plurality (n) of trainable modules, which communicate their states and gradients in the form of graphs, and in which the trainable modules are graph transformers that receive one or more graphs as inputs and output a graph, and each graph transformer within a subset of the plurality of graph transformers has one or more tunable parameters that are used to produce an output graph for its associated graph transformer, a method for training the network at the network level, comprises the steps of: a) computing for an nth module in the network a first gradient of the global objective function with respect to any tunable parameters in the nth module; b) computing a second gradient of the global objective function with respect to an input of the nth module; c) using the second gradient calculated in step b) to calculate a first gradient of the global objective function with respect to any tunable parameters in a next lower module in the network and a second gradient of the global objective function with respect to an input of the next lower module; d) repeating step c) for each successive module in the network until reaching the first module, whereby a gradient of the global objective function for each module is calculated with respect to any tunable parameters in said each module; and e) adjusting any tunable parameters in each module according to a gradient calculated for that module.

In an advantageous embodiment of this method of the present invention, each module includes a function that converts data attached to the input graph to data attached to the output graph using any tunable parameters in the module, and each function is differentiable with respect to any tunable parameters in the module and the data attached to the input graph.

According to another aspect of the present invention, a trainable network for performing a particular function includes a first graph transformer layer having a first input receiving data structured as a first graph, and a first output outputting data structured as a second graph, wherein the transformer layer uses differentiable functions to produce numerical information in the second graph from numerical information in the first graph and from at least one parameter. The trainable network also includes a second graph transformer layer being coupled to the first graph transformer later, having a second input receiving the second graph, and a second output outputting data structured as a third graph, wherein the second graph transformer layer uses differentiable functions to produce numerical information in the third graph from numerical information in the second graph and from at least one parameter. The trainable network includes a training algorithm calculating a first gradient of the particular function with respect to the at least one parameter in the second graph transformer, calculating a second gradient of the particular function with respect to the at least one parameter in the first graph transformer, and modifying the at least one parameter in the first and second graph transformers according to the second and first gradients, respectively, until reaching a minimum value for the particular function.

DETAILED DESCRIPTION

Rumelhart, D. E., Hinton, G. E., and Williams, R. J., "Learning Internal Representations By Error Propagation," *Parallel Distributed Processing: Explorations in the Microstructure of Cognition*, Vol. I, pages 318–362, Bradford Books, Cambridge, Mass. (1986) discloses a back-propagation procedure, which is widely used for multi-layer neural net training. Bottou, L. and Gallinairi, P., "A Framework for the Cooperation of Learning Algorithms," Touretzky, D. and Lippmann, R, ed., *Advances in Neural Information Processing Systems*, Vol. 3, Denver, Morgan Kaufmann (1991) discloses a simple generalization of the back-propagation procedure of Rumelhart et al., which can be used to efficiently compute the gradients of the objective function with respect to all the parameters in the system. For brevity purposes, these references are hereby incorporated by reference, as if repeated herein in their entirety.

Figure 1A:
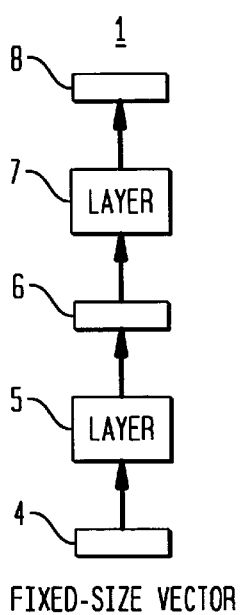
FIG. 1A depicts a traditional neural network that communicates fixed-size vectors between layers.
Figure 1B:
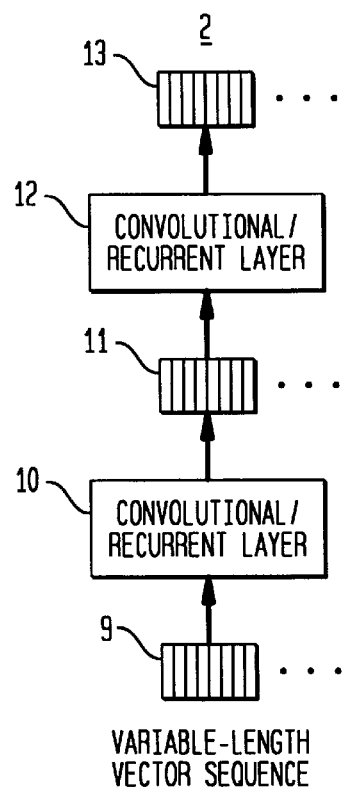
FIG. 1B depicts a convolutional/recurrent neural network that can handle variable-length sequences of vectors.
Figure 1C:
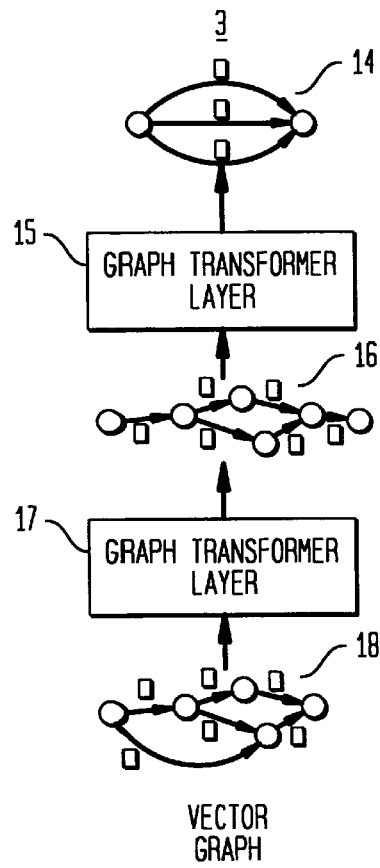
FIG. 1C depicts a multi-layer growth transformer network that are composed of trainable modules that operate on and produce graphs whose arcs carry numerical information according to the present invention.

Referring to FIG. 1(*a*), let us consider a system I built as a cascade of modules 5, 7, each of which implements a function F, where the output of the nth module $X_n = F_n(W_n, X_{n-1})$ where $X_n$ (element 8) is a vector representing the output of the nth module 7, $W_n$ is the vector of tunable parameters in the nth module 7 (a subset of W), and $X_{n-1}$ (element 6) is the nth module's 7 input vector (as well as the previous [(n-1)th] module's 5 output vector 6). Each module may or may not have any tunable parameters. If we assume that the partial derivative of E (the global objective function) with respect to $X_n$ is known, the partial derivative of E with respect to $W_n$ and $X_{n-1}$ can be computed using $$\partial E/\partial W_n = \partial F/\partial W(W_n, X_{n-1}) \partial E/\partial X_n$$

$$\partial E/\partial X_{n-1} = \partial F/\partial X(W_n, X_{n-1}) \partial E/\partial X_n$$

where $$\partial F/\partial W(W_n, X_{n-1})$$

is the Jacobian of F with respect to W evaluated at the point ($W_n$, $X_{n-1}$), and $$\partial F/\partial X(W_n, X_{n-1})$$

is the Jacobian of F with respect to X. Using the above equation, we can compute the complete gradient of E(W) working our way backwards from the output to the input as in the traditional back-propagation procedure.

By calculating the gradient of the global objective function with respect to the tunable parameters in each module, we can now adjust the tunable parameters in accordance with these gradients, e.g., by decrementing the tunable parameters by an amount equal to the gradient, or some other more complicated technique.

If the module does not have any tunable parameters, then the first partial listed above is simply not defined. In this case, the partial of E with respect to $X_{N-1}$ is calculated from the partial of E with respect to $X_N$ and the partial of F with respect to X evaluated at $X_{N-1}$.

Decrementing the tunable parameter by the calculated gradient is merely the simplest, but seldom used, way to adjust the tunable parameter according to the calculated gradient. Another method is to decrement the tunable parameter by an amount equal to the gradient multiplied by a positive constant (known as the learning rate or step size). This is known as the gradient descent algorithm. Other more complex algorithms can also be used in the present invention, such as the conjugate gradient, Newton, and adaptive step size algorithms. In these cases, the amount by which the tunable parameter is decremented is a complex function of the gradient and possibly other information, such as the second derivatives, the past update vector, various constants, etc. The forward pass is then repeated, and the back propagation pass is performed again. This is repeated until reaching the minimum of the global objective function.

Determining when to stop the learning process, i.e., when the minimum of the global objective function has been reached or no further useful information can be obtained from further iterations, can be complicated. If only one tunable parameter is involved, then one stops the learning process when the calculated gradient changes sign. However, if several tunable parameters are being updated simultaneously, then the gradient is a vector, and its sign is not defined. The two most commonly used criteria are when the global objective function stops decreasing significantly, or when the objective function measured on a different set of training examples stops decreasing, i.e., "validation" has been achieved. Other techniques for stopping the learning process are known to those of skill in the art of machine learning, and can be employed in this context.

Figure 8A:
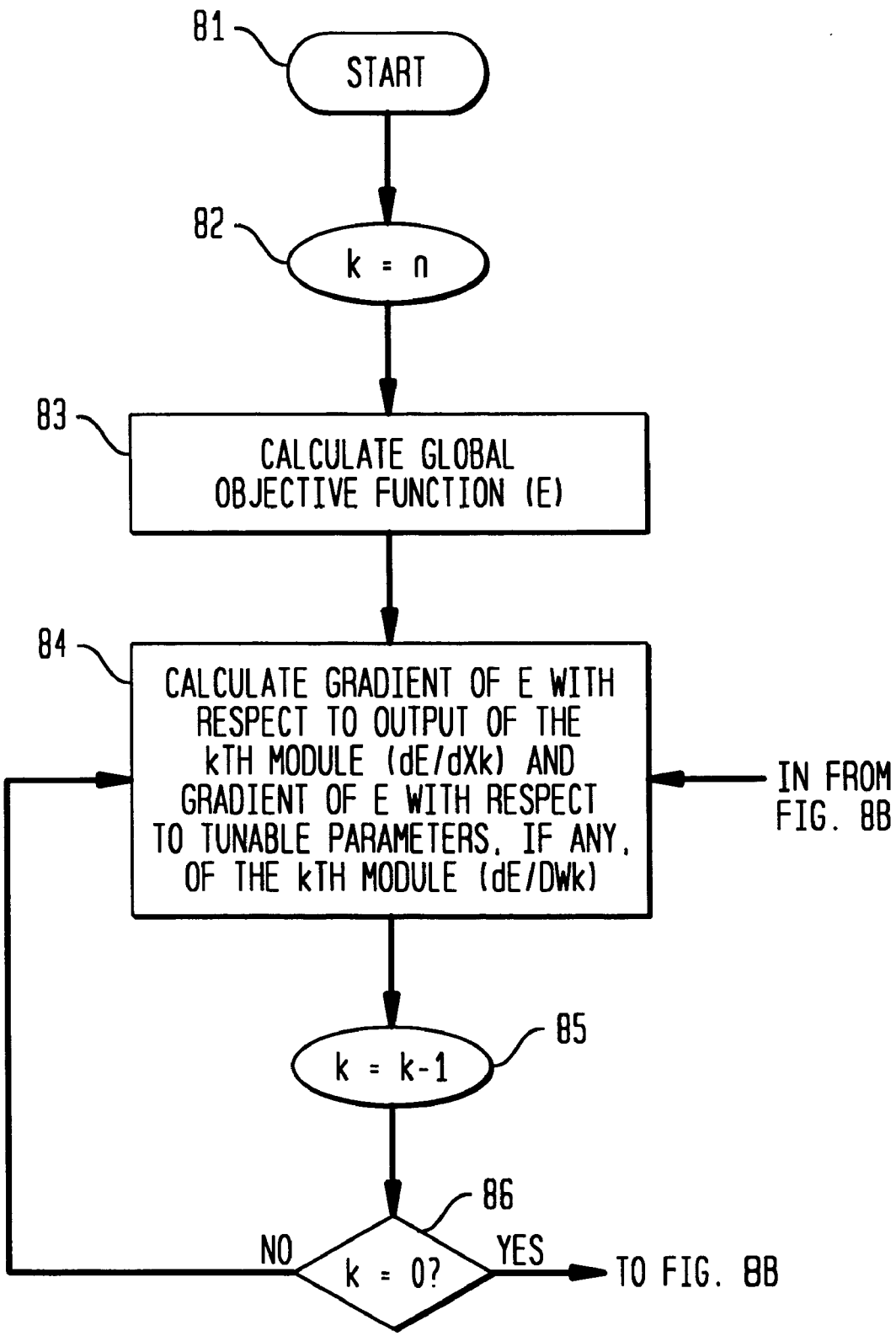
FIGS. 8A and 8B depict a flow chart of the back propagation phase and the adjustment of the tunable parameters used in the present invention.
Figure 8B:
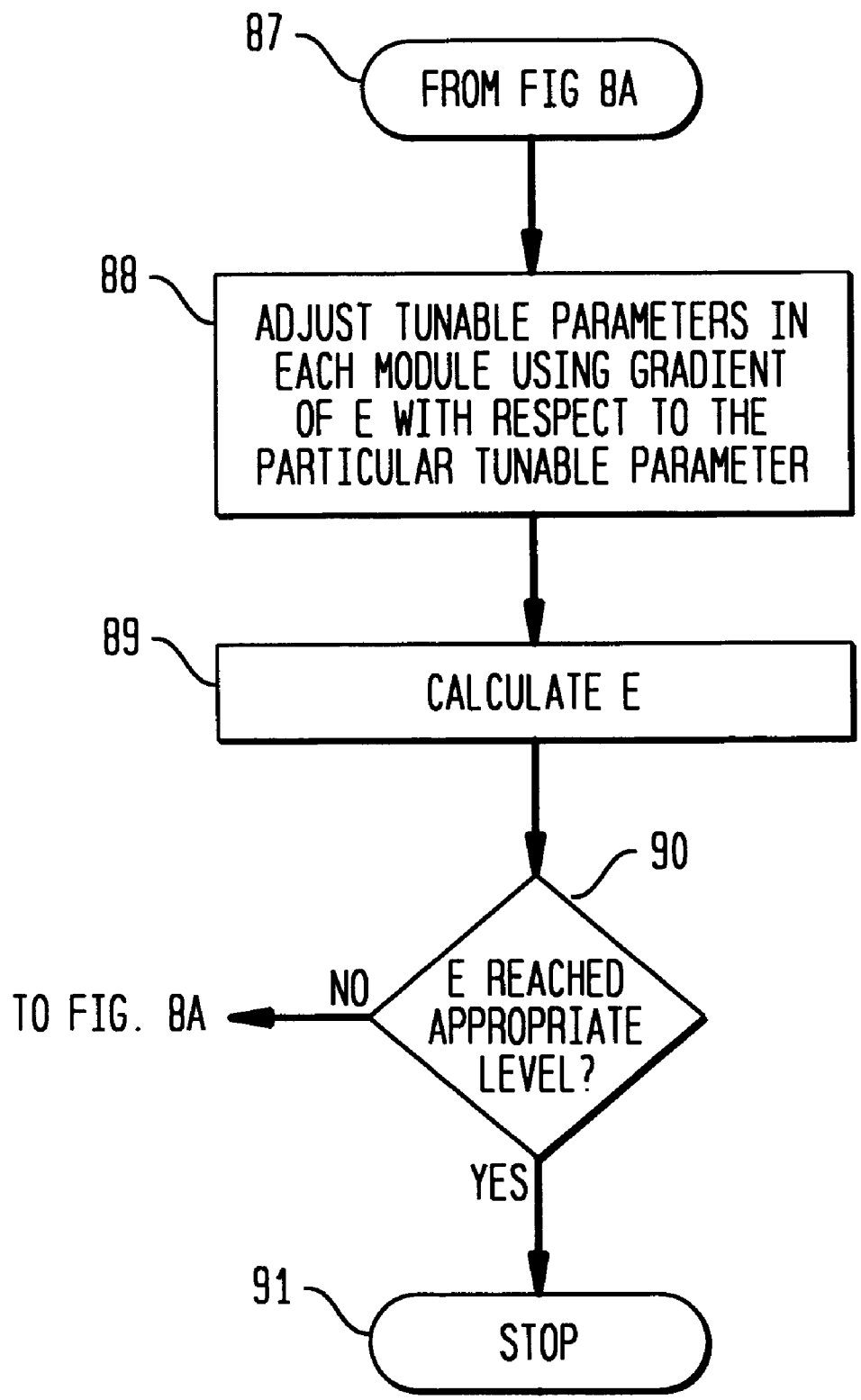

FIGS. 8A and 8B show the complete process used in the present invention to update the parameters and perform the back propagation of the gradients. First, the global objective function E is calculated for the nth module. Next, the gradients are calculated, both with respect to the input and the tunable parameters, if any. The counter is decremented and tested to determine if the first module has been reached. If not, the gradients are calculated for the next lowest module, and the cycle repeats until the gradients have been calculated for all modules. Turning to FIG. 8B, the tunable parameters are then adjusted as discussed above for each module. The global objective function is then calculated and tested to determine if "validation" has been achieved, or some other stopping criterion has occurred. If not, processing proceeds to recalculating of all of the gradients in element 84. Once "validation" is achieved, then the processing stops.

FIG. 1(*b*) shows an equivalent network 2 implemented using convolutional/recurrent layers 10, 12, in which the inputs 9 and outputs 11, 13 constitute variable-length vectors sequences.

The present invention applies gradient-based training to networks 3 (see FIG. 1(*c*)) of modules called graph transformers 15, 17 that communicate their states and gradients in the form of graphs 14, 16, 18 whose arcs carry numerical information (i.e., scalars or vectors). Graph transformers 15, 17 take one or more graphs as input 18 and construct a graph 16 on its output (see FIG. 1(*c*)).

For example, one simple graph transformer transforms an input graph to an output graph by replacing the numerical data attached to the arcs on the input graph with new numerical data. In this case, if we assume the new data attached to the arcs of the output graph is calculated according to the function y=f(x, w), where x represents the numerical data attached to the arcs of the input graph and y represents the numerical data attached to the arcs of the output graph, and w represents the tunable parameters, then according to the present invention the global objective function can be minimized using the back-propagation of gradients if f(x, w) is differentiable with respect to x and w.

A back-propagation phase takes gradients with respect to the numerical information in the output graph, and computes gradients with respect to the numerical information attached to the input graphs, and with respect to its internal parameters. Gradient-based learning can be performed as long as differentiable functions are used to produce the numerical data in the output graph from the numerical data in the input graph, and from the functions' parameters.

Graph Transformer Networks

To help make the concept of graph transformer networks a bit more concrete, a description of a trainable system built from three graph transformers in the context of handwriting recognition is presented. The task of the system is to find the best segmentation of a handwritten word into characters (see FIG. 2).

Figure 2:
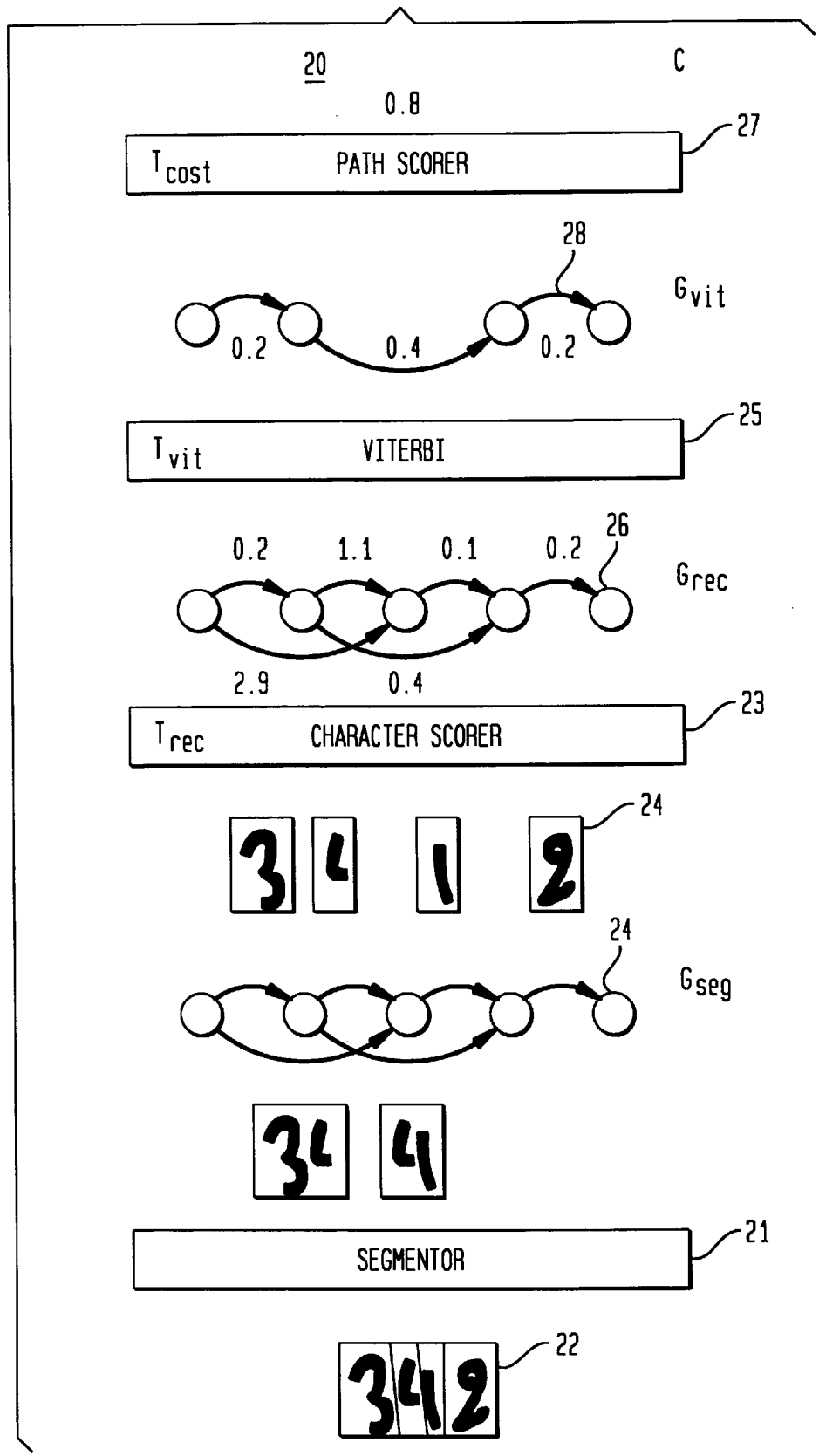
FIG. 2 depicts a simple example of a graph transformer machine that finds the best segmentation of a handwritten word according to the present invention.

Referring to FIG. 2, a handwriting recognition system 20 is depicted. First, a word image 22 is cut into "pieces of ink" using heuristic image processing techniques (such as connected components, vertical projections, etc.). Each piece of ink may be a whole character or a piece of character. The bottom of FIG. 2 shows an example of a three-character word cut into four pieces of ink.

A segmentor 21 builds a so-called segmentation graph $G_{reg}$ to represent all the possible groupings of pieces of ink into characters. Each arc is associated with one piece of ink or with a combination of successive pieces (called a segment), such that each path in the graph goes once and only once through each piece of ink. To each path corresponds a different grouping of the pieces of ink into characters. The output of the segmentor 21 is the directed graph 24.

The next layer is the character scorer 23 in which a first graph transformer $T_{rec}$, which we will call the recognition transformer, creates its output graph $G_{rec}$ 26 by replicating the segmentation graph $G_{seg}$ 24, replacing the segments by a positive number that indicates how good a character the segment is. If the segment is a good-looking character, the number is small (close to 0), if it is an incomplete or bad-looking character, the number is larger. These numbers can be seen as negative log-likelihoods, distances, or simply costs. They are generated from the segment images through a character scorer function $R_w$, parameterized by a vector w (e.g., a neural network with weight vector w). The cumulated cost over a path in $G_{rec}$ is the badness (or cost) of the corresponding segmentation.

The next layer constitutes the Viterbi layer 25, in which a second transformer $T_{Vit}$, called a Viterbi transformer, takes the $G_{rec}$ graph 26 as input and produces a trivial graph $G_{Vit}$ 28 whose only path is the lowest-cost path in the segmentation graph.

The final layer 27 includes yet a third transformer $T_{cost}$ that takes $G_{vit}$ 28 and outputs a single number: the accumulated cost C of $G_{vit}$ 28. These three transformers are very special cases of transformers. A first graph transformer $T_{rec}$, called a recognition transformer, creates its output graph by replicating the input graph and changing the content of the arcs. A second graph, known as a Viterbi transformer $T_{vit}$, changes the graph structure, but it simply duplicates a subset of the arcs on its output without changing their content. A third graph $T_{cost}$, merely outputs a single number from the input graph.

Back Propagation in Graph Transformer Networks

Back propagating gradients through the above system proceeds as follows. A first assumption is that the system is part of a larger system whose training minimizes an objective function E. For each variable x used the forward pass (e.g., arc costs, character scorer parameters, etc.), the back propagation phase will compute a corresponding partial derivative $\partial E/\partial x$.

Another assumption is that $\partial E/\partial C$, the gradient of E with respect to C, the accumulated cost over the best path, is known. Since C is simply the sum of the costs of each arc in $G_{vit}$, the gradients of E with respect to these costs are all equal to $\partial E/\partial C$.

Since $G_{vit}$ is a subset of $G_{rec}$, the derivatives of E with respect to the costs in $G_{rec}$ are equal to $\partial E/\partial C$ for those arcs that appear in $G_{vit}$, and 0 for all others. The gradient of E with respect to w, the parameter vector of the character scorer $R_w$ in $T_{rec}$, is simply the sum over all arcs in $T_{rec}$ of $\partial E/\partial C \partial R/\partial w$. This result was obtained by applying the chain rule to this type of data structure.

The difference with traditional neural networks, and other systems in which gradient-based learning is commonly applied, is that the architecture (or dataflow graph) in this case through which one propagates states and back propagates gradients changes with the input data.

Reading Check Amounts with a Graph Transformer Network

The idea of graph transformer networks was used to build a check amount reading system. The system must find candidate fields, select the field that is most likely to contain the amount, segment the fields into candidate characters, read and score the candidate characters, and finally find the best interpretation of the amount using contextual knowledge, namely a stochastic grammar for check amounts. We describe now a cascade of graph transformers (see FIG. 3) that starts with a check image and performs all these operations.

Figure 3:
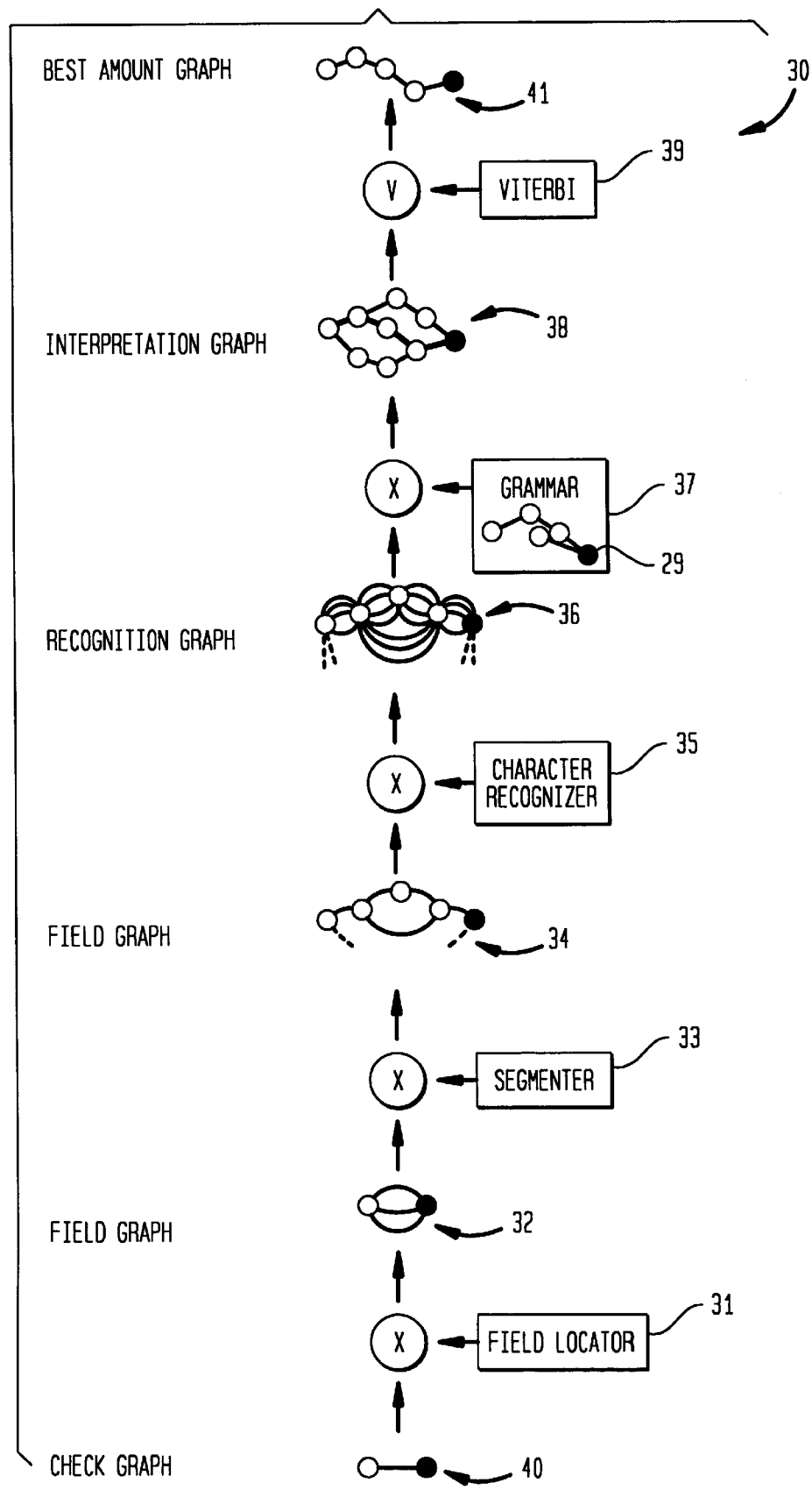
FIG. 3 depicts a complete check amount reader implemented as a single cascade of graph transformer modules according to the present invention.

FIG. 3 depicts a complete check amount reader 30 implemented as a single cascade of graph transformer modules 31, 33, 35, 37 and 39. In this implementation, successive graph transformations progressively extract high level information.

A Graph Transformer Network

We now describe the successive graph transformations that allow our network 30 to read the check amount. Each Graph Transformer produces a graph whose paths encode and score the current hypothesis considered at this stage of the system.

Figure 4:
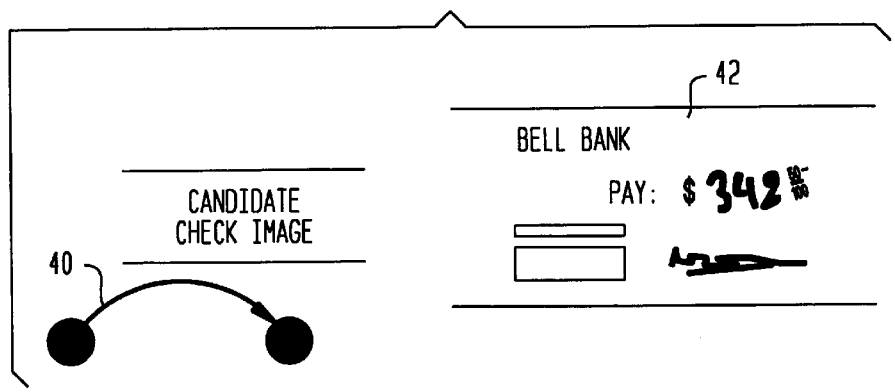
FIG. 4 depicts the initial graph in the check reader of FIG. 3.

The input to the system 30 is a trivial graph 40 whose only arc carries the image of the whole check 42. As shown in FIG. 4, the initial graph 40 contains a single path representing the whole check image 42.

Figure 5:
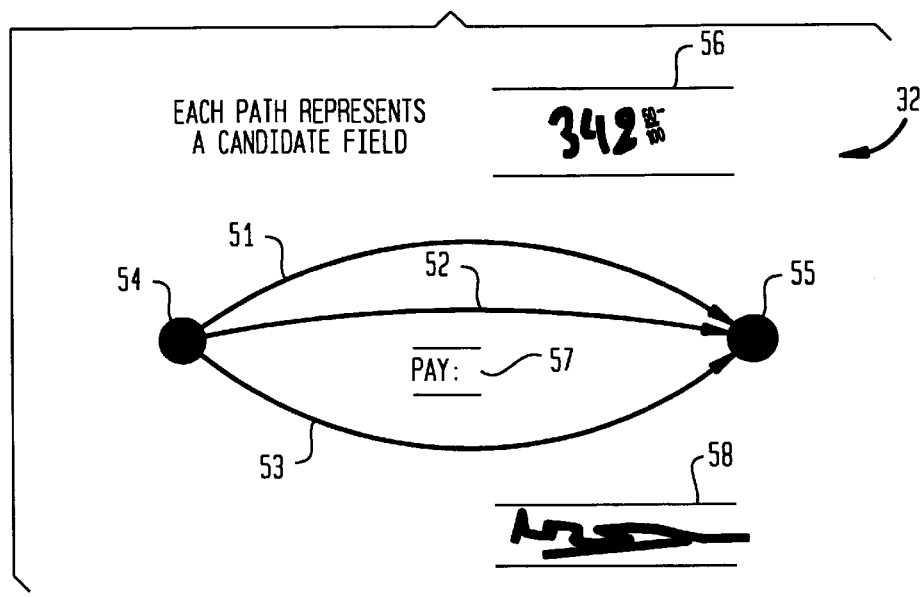
FIG. 5 depicts the field graph used in the check reader of FIG. 3.
Figure 6:
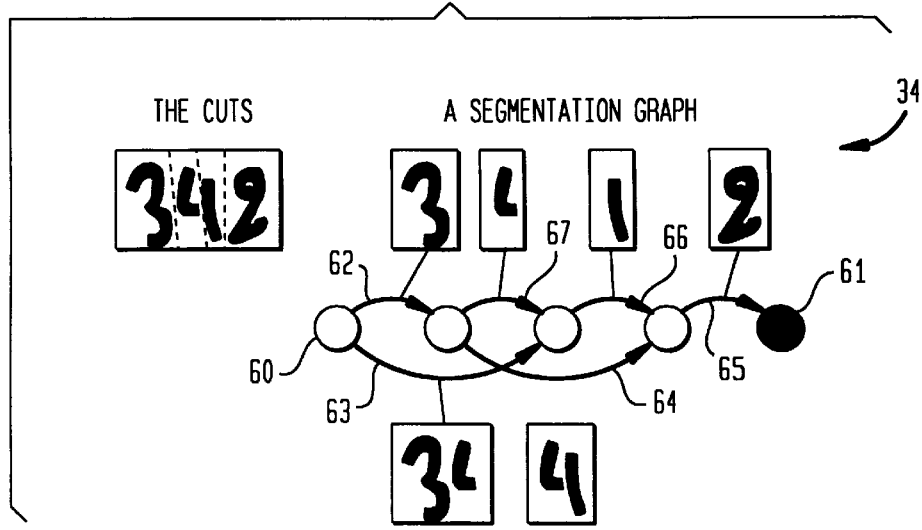
FIG. 6 depicts the segmentation graph used in the check reader of FIG. 3.

The field location transformer, $T_{field}$ 31, first performs classical image analysis (including connected components, ink density histograms, etc.) and heuristically extracts rectangular zones that may contain the check amount. $T_{field}$ produces an output graph 32, called the field graph 32 (see FIG. 5), such that each candidate zone 56–58 found is associated with one arc 51–53 that links the start node 54 to the end node 55. As shown in FIG. 5, the field graph 32 represents the few rectangular areas that may contain the check amount. Each arc 51–53 carries a rough score based on the features extracted by the initial image analysis.

Each arc contains the image of the zone, and a "penalty term" computed from simple features extracted from the zone (absolute position, size, aspect ratio, etc.). The penalty term is close to zero if the features suggest that the field is a likely candidate, and is large if the field is deemed less likely to be an amount. If the penalty function is differentiable, its parameter is globally tunable.

The segmentation transformer, $T_{seg}$ 33, similar to the one described earlier, examines each zone contained in the field graph 32, and cuts each image into "pieces of ink" using heuristic image processing techniques. Each piece of ink may be a whole character or a piece of character. Each arc 51–53 in the field graph 32 is replaced by its corresponding segmentation graph 34 that represents all possible groupings of pieces of ink. Each field segmentation graph 34 is appended to an arc 62–67 that only contains the penalty of the field in the field graph 32.

Each arc 62–67 carries the segment image, together with a penalty that provides a first evaluation of the likelihood that the segment actually is a character. This penalty is obtained with a differentiable function that combines a few simple features such as the space between the pieces of ink, or the compliance of the segment image with a global baseline, using a few tunable parameters.

The segmentation graph 34 represents all the possible segmentations of all the field images. We can compute the penalty for one segmented field by adding the arc penalties along the corresponding path. As before, using a differentiable function for computing the penalties will ensure that the parameters can be optimized globally.

The recognition transformer, $T_{rec}$ 35, iterates over all segment arcs in the segmentation graph 34 and runs a character recognizer on the corresponding segment image. In our case, the recognizer is a Convolutional Neural Network, whose weights constitute the largest and most important subset of tunable parameters. The recognizer classifies images into one of 15 classes (10 digits, asterisk, dollar sign, dash, comma, period), plus "junk" classes for other symbols or badly-formed characters.

Each arc in the input graph is replaced by 16 arcs in the output graph. Each of those 16 arcs contains the label of one the classes, and a penalty that is the sum of the penalty of the corresponding arc in the input graph and the penalty associated with classifying the image in the corresponding class, as computed by the recognizer. In other words, the recognition graph 36 represents a weighted trellis of scored character classes. Each path in this graph 36 represents a possible character string for the corresponding field. We can compute a penalty for this interpretation by adding the penalties along the path. This sequence of characters may or may not be a valid check amount.

The grammar transformer, $T_{gram}$ 37, selects the paths of the recognition graph 36 that represent valid character sequences for check amounts. This transformer takes two graphs as input: the recognition graph 36, and the grammar graph 29. The grammar graph 29 contains all possible sequences of symbols that constitute a well-formed amount. The output of the grammar transformer 37, called the interpretation graph 38, contains all the paths in the recognition graph 36 that are compatible with the grammar graph 29. The graph transformation operation that combines the two input graphs to produce the output is called a graph composition.

Although a graph composition in general is quite complex, it can be explained using a simple metaphor. To generate the interpretation graph we place a token on the start node of the recognition graph 36 and a token on the start node of the grammar graph 29. We can simultaneously advance the two tokens along two arcs that the numerical information attached with the two arcs match according to a matching function. In our case, the matching function simply checks that the class labels on the two arcs are identical. When the two tokens are moved, an arc in the output graph is created. A differentiable function is used to compute the data attached to the output arc from the data attached to the input arcs. In our case, the output arc receives the class label of the two arcs, and a penalty computed by simply summing the penalties of the two input arcs (the recognizer score, and the arc penalty in the grammar graph).

The above procedure produces a tree, but simple techniques can be used to avoid generating multiple copies of certain subgraphs by detecting when a particular output state has already been seen. Each path in the interpretation graph 38 represents one interpretation of one segmentation of one field on the check. The sum of the penalties along the path represents the "badness" of the corresponding interpretation and combines evidence from each modules along the process, as well as from the grammar.

The Viterbi transformer 39 finally selects the path with the lowest accumulated penalty, corresponding to the best grammatically correct interpretations.

If a probabilistic score is desired, we can obtain one by computing the ratio between (a) the negative exponential of the total penalty of best path, and (b) the sum of the negative exponentials of the penalties of all the paths. Such path probabilities are clearly positive and sum to one. The denominator is easily computed using the forward algorithm widely used in Hidden Markov Model-based speech recognition systems.

We can directly compute its logarithm by proceeding forward in the graph and setting the penalty of each node to the logsum of the penalties of the incoming arcs added with the penalties of the upstream nodes. The penalty of the end node can be interpreted as the negative log-likelihood that the check contains a grammatically correct amount.

A similar procedure can be used to compute the negative log-likelihood of any amount chosen. For instance, computing the ratio between (a) the sum of the negative exponential of the penalties of all paths representing the correct amount, and (b) the sum of negative exponential of the penalties of all paths, will obtain the log-likelihood attributed by the system to the correct answer. This is particularly useful for global training as will be discussed below.

Gradient-Based Learning

Each stage of this check reading system contains tunable parameters. While some of these parameters could be manually adjusted, for example the parameters of the field locator 31 and segmentor 33, the vast majority of them must be learned, particularly the weights of the neural-net recognizer 35.

Prior to globally optimizing the system, each module's parameters must be initialized with reasonable values. The parameters of the field locator 31 and the segmentor 33 can be initialized by hand. The parameters of the neural net character recognizer 35 can be initialized by training on a database of pre-segmented and labeled characters. Then, the entire system can be trained globally from whole check images labeled with the correct amount. No explicit segmentation of the amounts is needed to train the system: it is trained at the check level.

The objective function E minimized by our global training procedure is a discriminant criterion similar to the Maximum Mutual Information criterion used in speech recognition systems based on Hidden Markov Models. This criterion is the difference between the accumulated penalty of the correct answer, and the negative log-likelihood for the full grammar, as computed by the forward algorithm described above. Since the grammar includes the correct answer, the objective function is always positive. It is zero if the penalties of the wrong answers are infinitely larger than the penalty of the correct answer. For the training phases, we therefore pass the interpretation graph 38 through two transformers (a "constrained forward algorithm" and a "free forward algorithm") that output the corresponding negative log-likelihoods, the difference of which is E. The partial derivatives of E with respect to the arc penalties in the interpretation graph 38 are simply computed by back-propagation. All the arc penalties along the paths representing the correct answer will have a positive gradient, while all other arcs will have negative gradients.

Once we have those, we back-propagate gradients through the grammar transformer 37 and obtain partial derivatives with respect to the penalties on the recognition graph 35 and on the grammar graphs 29. This can be done if we keep track of which arcs in the grammar and recognition were used to generate which arc on the interpretation graph 38. Since these scores $s_{int}$ are simple combinations of the arc scores of the grammar graph 29 and of the arc scores of the recognition graph 36, we can compute the derivatives $\partial L/\partial w_{gram}$ with respect to the tunable parameters of the grammar 29 and the derivatives $\partial L/\partial s_{rec}$ with respect to the arc scores of the recognition graph 36.

Since these scores $s_{rec}$ are simple combination of the arc scores of the segmentation graph 34 and of the scores returned by the isolated character recognizer 35, we can first compute the derivatives $\partial L/\partial s_{net}$ with respect to the outputs of the character recognizer 35 and therefore compute the derivatives $\partial L/\partial w_{net}$ of all tunable parameters of the recognizer 35. We can also compute the derivatives $\partial L/\partial s_{seg}$ with respect to all scores of the segmentation network 33.

Since these scores $s_{seg}$ are simple combination of the arc scores of the field graph 31 and of the tunable parameters of the segmenter 33, we can compute the derivatives $\partial L/\partial w_{seg}$ with respect to the tunable parameters of the segmenter 33 and the derivatives $\partial L/\partial s_{field}$ with respect to the arc scores of the field graph 31.

Finally we can use these latter derivatives to compute the derivatives $\partial L/\partial_{field}$ with respect to the parameters of the field locator 31. To accomplish this, we have applied the chain rule to a very complicated architecture.

Shape Recognition with Convolutional Neural Networks

The recognizer 35 used in the Check Reading System is a convolutional neural network coined LeNet5 70. Convolutional neural nets are specifically designed to recognize 2D shapes with a high degree of invariance with respect to translations, scaling, skewing, and other distortions. They can directly accept images with no preprocessing other than a simple size normalization and centering. They have had numerous applications in handwriting recognition, and object location in images, particularly faces.

Figure 7:
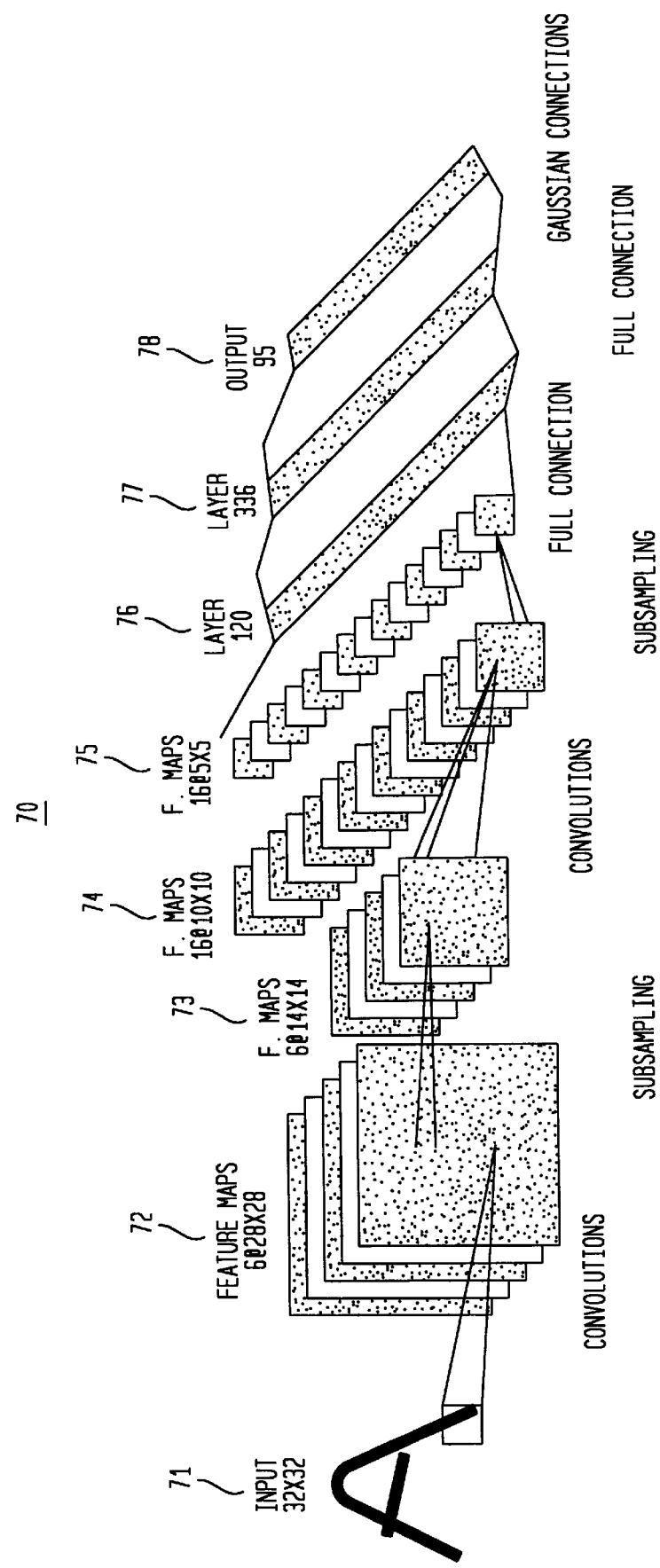
FIG. 7 depicts the architecture of LeNet5, which is a check reading system implementing the method of the present invention.

The architecture of LeNet5 70 is shown in FIG. 7. In a convolutional net, each unit takes its input from a local "receptive field" on the layer below, forcing it to extract a local feature. Furthermore, units located at different places on the image are grouped in planes, called feature maps, within which units are constrained to share a single set of weights. This makes the operation performed by a feature map shift invariant, and equivalent to a convolution, followed by squashing functions. This weight-sharing technique greatly reduces the number of free parameters. A single layer is formed of multiple feature maps, extracting different features types.

Complete networks are formed of multiple convolutional layers, extracting features of increasing complexity and abstraction. Sensitivity to shifts and distortions can be reduced by using lower-resolution feature maps in the higher layers. This is achieved by inserting subsampling layers between the convolution layers. It is important to stress that all the weights in such a network are trained by gradient descent. Computing the gradient can be done with a slightly modified version of the classical Back propagation procedure. The training process causes convolutional networks to automatically synthesize their own features. LeNet5 has 401,000 connections, but only about 90,000 free parameters because of the weight sharing.

Graph Transformer Networks (Generalized)

This section generalizes the framework presented in the check reading examples. Three areas are discussed: (a) the interpretation of graphs, (b) the construction of graph transformers, and (c) the training of graph transformer networks.

Directed Graphs

The network architecture disclosed by the present invention comprises a series of processing layers that produce graphs, including directed graphs, which have the following characteristics:

(1) the graphs are composed of nodes and directed arcs. Nodes are unnamed except for the start node and the terminal node. Each directed arc goes from an upstream node to a downstream node.

(2) Each arc carries a data structure whose nature depends on the semantic of the graph. This data structure often includes a score as well as some descriptive information, e.g., a check image, a field image, a list of pieces of ink, a character code, etc.

(3) Some conventions are useful for simplifying the graph algorithms described later: (a) no arc begins on the terminal node, and (b) each directed arc belongs to a path linking the start node to the terminal node via zero or more intermediate nodes.

The state of the system after each processing layer is completely represented by the output graph produced by this layer. These graphs are constructed using explicit rules that describe (a) what are the data structures carried by the arcs of the graph, and (b) how the graph should be interpreted.

For instance, all graphs of the check reading example represent a set of alternative hypotheses (e.g., field hypothesis, segmentation hypothesis, character string hypothesis, amount hypothesis). Each hypothesis is represented by the data structures carried by the arcs of a particular path linking the start node to the end node. Comparing hypotheses is achieved by comparing their score, i.e., the sum of the scores of the arcs along the corresponding path.

Designing a graph for representing alternative hypotheses actually consists in designing a sequential language for representing the hypothesis. The data structures carried by the arcs are the word of this language. An alternative hypothesis graph is equivalent to a set of sentences and an efficient way to produce a score to each of them.

Probabilistic Interpretation of the Scores

The precursors of Graph Transformer Networks were often speech recognition or character recognition systems combining Hidden Markov Models and Neural Networks. A Hidden Markov Model indeed can be viewed as a graph encoding alternative hypotheses in which all scores have a clear probabilistic interpretation.

Several methods have been devised for transforming the arbitrary scores produced by a Neural Network into probabilities. It is then possible to perform computations on these quantities using standard probabilistic methods (i.e., marginalization and conditionment). All scores in the systems therefore have a clear probabilistic interpretation (like Hidden Markov Models).

This transformation must produce quantities that fulfill the essential properties of a probability:

a) Probabilistic computations obey well defined rules: The probability that any of several exclusive events occurs is the sum of the probability of the events. The probability of simultaneous occurrences of independent evens is the products of the probabilities of these events. Probabilities must also be positive. This constraint can be satisfied by considering that the scores are in fact the logarithms of the actual probabilities. This encoding moreover improves the numerical stability of the computations. We can indeed perform direct computation on the scores by log-adding or adding scores instead of adding or multiplying probabilities. The log-sum of two values x and y is:

$x \oplus y = \log(e^x + e^y) = \max(x,y) - \log(1 + e^{-|x-y|})$.

b) Probabilities must be normalized. The normalization in fact means that we are delimiting a prior the set of possible outcomes. This set is then given probability one (1.0). Assigning a probabilistic meaning to scores therefore implies a non-trivial assumption whose consequences must be clearly understood. To illustrate this point, image a check reading system that produces a score s(X) for all possible amount X. One can obviously construct probabilities p(X) such that $$\sum_x p(X) = 1.$$

Such a construction assumes that every check image bears an amount. As a consequence, there is no clear agreement about a normalization method. Authors have proposed to normalize scores using the prior probabilities of the classes, using a sampling scheme or by simply ensuring that the resulting probabilities sum to the unity.

A premature normalization, however, may delete useful information. Assume for instance that we normalize the scores returned by our isolated character recognizer. Since we are searching for the best segmentation, the recognizer will be submitting images that do not represent valid characters. Although the best scoring class for these images will have a very low score, this score may be higher than the scores of the other classes (e.g., all vertical bars look like character "1"). In such a case, the normalization hides the fact that the recognizer has assigned a low score for all classes because the image does not display a valid character. We would then select a wrong segmentation and produce an erroneous answer.

Thus, normalization should be postponed as much as possible. The arc scores and the path scores are handled as unnormalized log-probabilities (i.e., satisfying the computational properties of a) but not the normalization properties of b)). These scores no longer have a clear probabilistic meaning by themselves.

A conditional probability for each hypothesis represented by a graph can be computed given the assumption that the correct alternative is one of them. The log-sum of scores of the paths representing this hypothesis is normalized by subtracting the log-sum of the scores of all paths in the graph.

Graph Transformers

A Graph Transformer Network is a trainable data processing architecture composed of a succession of Graph Transformers. Each module gets a directed graph as its input and produces a new directed graph as its output. This operation involves two different tasks:

1) the creation of a new graph lattice on the basis of the input graph. This operation is entirely defined by the module program. Typical graph transformations include graph refinement (i.e., replacing certain arcs by a complex subgraph), grammar filtering (i.e., producing a graph implementing only the subset of paths of the input graph that comply with a predefined grammar), graph rewriting (i.e., replacing predefined sequences of arcs by new sequences of arcs) and graph pruning (i.e., removing paths that do not match predefined criteria).

2) the creation of the data structure attached to the arcs of the new graph. This operation typically involves the transformation of data attached to certain arcs of the input graph and the computation of a numerical score. This computation often involves tunable parameters attached to the module.

The transducer framework provides a unified description for graph transformation modules. A very wide class of graph transformation algorithms can be encapsulated in a transducer object and processed using common algorithms.

Graph Arithmetic Using Transducers

The transformation of a n input graph into an output graph is elegantly represented using a third graph named transducer graph. The output graph is produced by performing a graph composition of the input graph and of the transducer graph.

Simple Graph Composition

We describe now the graph composition algorithm in the simple case where the arcs of the input and output graphs carry only a symbolic label and no numerical information. Each path of these graphs represents the sequence of symbolic labels attached to the successive arcs.

The arcs of a transducer graph carry two symbolic labels, hereafter referred to as the input symbol and the output symbol. Each path of the transducer graph represents a mapping from a sequence of input symbols to a sequence of output symbols. These sequences may have different lengths because we allow arcs labeled with special null symbols which are not considered when gathering the actual sequences of symbols.

The graph composition algorithm generates an output graph that represents all sequences of out put symbols that can be mapped from a sequence of input symbols represented by the input graph.

Imagine two daemons, one sitting on the start node of the input graph, the other one of the start node of the transducer graph. The daemons can freely follow any arc labeled with a null symbol. A daemon can follow an arc labeled with a non null symbol if (and only if) the other daemon also follows an arc labeled with the same input symbol.

We have acceptable daemon trajectories when both daemons reach the end nodes of their graphs. Both trajectories represent the same sequence of non null input symbols. The output symbols collected along the trajectory of the transducer daemon describe one path of the output graph.

The mere recursive enumeration of the acceptable daemon trajectories leads to a tree representing all acceptable sequences of output symbols. At any point of the enumeration, the future choices for out daemons are completely determined by the position of the daemons in each graph. We can thus shortcut the tree generation when we reach an already visited daemon configuration. We just create an arc connected to the node of the output graph corresponding to this daemon configuration. This process generates the output graph.

Virtual Transducers

A naive implementation of the graph composition algorithm would be extremely inefficient because we would need to traverse actual graphs stored in memory. Transducer graphs tend to be very large. A good implementation relies on object oriented technology. The base graph class defines virtual accessor functions for traversing a graph. We can then define derived classes for composed graphs (i.e., the output of a graph composition). Traversing a composed graph through the accessor functions triggers the on-demand execution of the graph composition algorithm.

Similarly, transducer objects can have additional virtual functions that optimize the inner loops of the graph composition algorithm.

match ($a_{inp}$, $n_{tran}$)

This function returns a list of arcs starting on node $n_{trans}$ of the transducer matching arc $a_{inp}$ of the input graph. This list can be computed on the fly using whatever optimization is allowed by the internal structure of the transducer object.

build $(a_{inp}, a_{tran}, n_{up}, n_{down})$

This function builds an arc between nodes $n_{up}$ and $n_{down}$ of the output graph. This arc represents the match between the arc $a_{inp}$ of the input graph and the arc $a_{tran}$ of the transducer graph. The virtual function build $(a_{inp}, a_{tran}, n_{up}, n_{down})$ can also generate a complete subgraph between nodes $n_{up}$ and $n_{down}$. This possibility provides another way to create transducer mapping sequences of different lengths (besides using null symbols).

The virtual function build $(a_{inp}, a_{tran}, n_{up}, n_{down})$ provides moreover an excellent opportunity for computing the data structure attached to the arcs of the output graph, on the basis of the data structures attached to the arcs of the input graph and the transducer graph.

The score of the arcs of the output graph, for instance, can be computed as the sum of the scores of the matching input and transducer arcs. Such a transducer is called a weighted transducer. It is possible to perform whatever computation is useful for the given application, e.g., calling a complex neural network for recognizing isolated characters.

This framework drastically simplifies the programming task. A number of useful graph transformation algorithms can be encapsulated as virtual transducers and processed using a common composition algorithm without significant loss of efficiency. This algorithm takes care of all bookkeeping and lets one concentrate on the actual computations represented by the graph transformer.

Global Training

Next follows the principles and the implementation of the learning algorithms that optimize a single cost function by simultaneously adjusting the tunable parameters of all successive graphs transformers.

Each iteration of the optimization procedure consists of:
i) computing the gradient of the cost function with respect to the parameters.
ii) updating the parameters using any gradient based optimization algorithm (e.g., online gradient descent, conjugate gradients, etc.). These algorithms assume that the cost is a smooth function of the parameters.

Such a global training is often applied after initializing the parameters of each module by training them separately on smaller databases. Global training then produces a performance improvement for two major reasons:

1) The databases uses for initializing each module are indeed created by simulating by hand the ideal operation of the other modules (e.g., bootstrapping a character recognizer using a hand-segmented characters). Global training can take advantage of larger databases because less manual operations are required.
2) The training procedure applied for bootstrapping each module optimizes a local cost function which is not directly related to the global performance goal. The bootstrapping databases are built on the assumption that the other modules are performing flawlessly. Global training avoids these approximations.

Gradient Back Propagation

This concerns the computation, for each example x, of the gradient of the cost function $Q(x,w)$ with respect to all tunable parameters w of the Graph Transformer Network. Certain parameter update algorithms indeed directly use these gradients (e.g., online gradient descent); other parameter update algorithms work better after averaging the gradients over small chunks of examples x (conjugate gradients).

The computation of this gradient follows the same basic idea as the well known Back Propagation algorithm. The cost of the function of the parameters can be view as the composition of the functions implemented by the network layers (i.e., the graph transformers) and of the cost as a function of the network output (i.e., the graph output by the last transformer). The gradient of the cost function can be computed using the chain rule in a single backward pass over the dataflow graph describing the computation of the cost function. See Bottou and Gallinari, "a Framework for the Cooperation of Learning Algorithms," In Touretzky, D. And Lippman, R. editors, *Advances in Neural Information Processing Systems*, volume 3, Denver. Morgan Kaufmann for an excessively formal description of a generalized back-propagation algorithm for feedforward computational structures, which is hereby incorporated by reference as if repeated herein in its entirety.

Since the topology of the graphs can change when the input data changes, the dataflow graph therefore is not known in advance (unlike the dataflow of Multilayered neural networks). One must therefore record the current dataflow graph as one is running the successive Graph Transformers on the current example.

In other word, to compute the gradient of $Q(x,w)$, one must first run all Graph Transformers on example x. When running each transformer, one must record how one computed each numerical value stored in the arcs of the output graph. The recorded dataflow graph can then be used to compute the gradient of the cost with respect to (a) the tunable parameters of this transformer, and (b) the values stored on the arcs of the input graph. We can then reiterate this operation on all transformers and therefore compute the gradient of the cost with respect to all tunable parameters in the system.

This process calls for two remarks:
i) The transducer framework helps recording the dataflow graph. All numerical computations indeed are performed by a single function, named build $(a_{inp}, a_{tran}, n_{up}, n_{down})$.
ii) This computation requires that all numerical values involved in the computation of the cost are computed using differentiable functions of the tunable parameters and of the values stored in the previous graph.

The differentiability constraint has to be considered when designing graph transformers. The typical operations required for computing scores (e.g., log-addition, addition, maximum and minimum are nicely differentiable almost everywhere. Using differentiable functions with wild derivatives, however, would jeopardize the optimization algorithm. The practical experience acquired at training large neural networks apply fully here.

Summary

The present invention includes a new architecture for trainable systems that significantly extends the domain of applications of multi-layered networks and gradient-based learning. One result of the present invention is that all the steps of a document analysis system can be formulated as graph transformers through which gradients can be back-propagated, thus enabling a trainable Graph Transformer Network. The present invention also includes a check reading system, based on the above architecture.

Although the present invention presents a small number of examples of Graph Transformer Modules, it is clear that the concept can be applied to many situations where the domain knowledge or the state information can be represented by graphs. This is the case in many scene analysis systems.

According to an aspect of the present invention the functions implemented by many of the modules used in typical document processing systems (and other image recognition systems), though commonly thought to be combinatorial in nature, are indeed differentiable with respect to their internal parameters as well as with respect to their inputs, and are therefore usable as part of a globally trainable system.

What is claimed is:

1. A computerized method of training a network of graph transformers comprising the steps of:
   generating a network of graph transformers, each graph transformer having an input receiving a first graph, having an output outputting a second graph, and having an internal function producing data in the second graph from data in the first graph;
   wherein said network of graph transformers includes:
   a) at least one tunable graph transformer having at least one tunable parameter being used to produce data in the second graph of the at least one tunable graph transformer from data in the first graph of the at least one tunable graph transformer;
   b) the internal function of each graph transformers differentiable with respect to data in the first graph and
   c) the internal function of the at least one tunable graph transformer also differentiable with respect to the at least one tunable parameter; and
   back-propagating gradients through the network to determine a minimum of a global objective function of the network; wherein said back-propagated gradients are used to train said network of graph transformers.

2. The method according to claim 1, wherein the back-propagation step determines the minimum of the global objective function by:
   a) calculating a gradient of the global objective function by back-propagating gradients through the network;
   b) adjusting the at least one tunable parameter using the calculated gradient of the global objective function; and
   c) repeating steps a) and b) until reaching the minimum of the global objective function.

3. The method according to claim 2, wherein the step b) of adjusting further comprises decrementing the at least one tunable parameter by an amount equal to the calculated gradient of the global objective function.

4. The method according to claim 2, wherein the step b) of adjusting further comprises decrementing the at least one tunable parameter by an amount equal to the calculated gradient of the global objective function multiplied by a positive constant.

5. The method according to claim 2, wherein the step b) of adjusting further comprises decrementing the at least one tunable parameter by an amount equal to the calculated gradient of the global objective function multiplied by a step size.

6. The method according to claim 2, wherein the step b) of adjusting further comprises decrementing the at least one tunable parameter by an amount equal to the calculated gradient of the global objective function multiplied by a learning rate.

7. The method according to claim 2, wherein the step b) of adjusting further comprises adjusting the at least one tunable parameter according to the gradient descent algorithm.

8. The method according to claim 2, wherein the step b) of adjusting further comprises adjusting the at least one tunable parameter according to the conjugate gradient algorithm.

9. The method according to claim 2, wherein the step b) of adjusting further comprises adjusting the at least one tunable parameter according to the Newton algorithm.

10. The method according to claim 2, wherein the step b) of adjusting further comprises adjusting the at least one tunable parameter according to the adaptive step-size algorithm.

11. The method according to claim 2, wherein the step b) of adjusting further comprises adjusting the at least one tunable parameter using a complex function of the calculated gradient of the global objective function.

12. The method according to claim 2, wherein the step b) of adjusting further comprises adjusting the at least one tunable parameter using a complex function of the calculated gradient of the global objective function and secondary information.

13. The method according to claim 12, wherein the secondary information includes the second derivative of the calculated gradient of the global objective function.

14. The method according to claim 12, wherein the secondary information includes a previous update vector.

15. The method according to claim 12, wherein the secondary information includes a plurality of constants.

16. The method according to claim 2, wherein the steps a) and b) are repeated until the calculated gradient of the global objective function reaches an acceptable level.

17. The method according to claim 2, wherein the steps a) and b) are repeated until the calculated gradient of the global objective function falls below a predetermined threshold.

18. The method according to claim 2, wherein the steps a) and b) are repeated until the global objective function stops decreasing significantly.

19. The method according to claim 2, wherein the steps a) and b) are repeated until the global objective function when measured on a different set of training examples stops decreasing.

20. The method according to claim 2, wherein the steps a) and b) are repeated until validation is achieved.

21. The method according to claim 2, wherein the steps a) and b) are repeated until achieving a stopping criterion.

22. In a network composed of a plurality (n) of trainable modules, which communicate their states and gradients in the form of graphs, and in which the trainable modules are graph transformers that receive one or more graphs as inputs and outputs a graph, and each graph transformer of a subset of the graph transformers has one or more tunable parameters that are used to produce an output graph for said each graph transformer, a computerized method for training the network at the network level, comprising the steps of:
   a) computing for an nth module in the network a first gradient of a global objective function with respect to any tunable parameters in the nth module;
   b) computing a second gradient of the global objective function with respect to an input of the nth module;
   c) using the second gradient calculated in step b) to calculate a gradient of the global objective function with respect to any tunable parameters in a next lower module in the network and a gradient of the global objective function with respect to an input of the next lower module;
   d) repeating step c) for each successive module in the network until reaching the first module, whereby a gradient of the global objective function for each module is calculated with respect to any tunable parameters of said each module;
   e) adjusting any tunable parameters in each module according to a gradient calculated for that module; and,
   f) using said adjusted tunable parameters to train said network at the network level.

23. The method according to claim 22, further comprising the step of:
- g) repeating the steps a) through e) until reaching a minimum of the global objective function.

24. The method according to claim 22, further comprising the step of:
- g) repeating the steps a) through e) until the gradients for all of the modules fall below a predetermined threshold.

25. The method according to claim 22, further comprising the step of:
- g) repeating the steps a) through e) until all of the gradients for all of the modules reach an acceptable level.

26. The method according to claim 22, wherein each module includes a function that converts data attached to the input graph to data attached to the output graph using any tunable parameter in said each module, and the function is differentiable with respect to any tunable parameters in said each module and the data attached to the input graph of said each module.

27. The method according to claim 22, wherein the first gradient in the nth module is calculated using the following equations:

$$\frac{\partial E}{\partial W_n} = \frac{\partial F}{\partial W}(W_n, X_{n-1})\frac{\partial E}{\partial X_n}$$

and $$\frac{\partial E}{\partial X_{n-1}} = \frac{\partial F}{\partial X}(W_n, X_{n-1})\frac{\partial E}{\partial X_n}$$

where F is a function used by the nth module to convert a graph input to the nth module to a graph output by the nth module, $X_{x-1}$ is the input to the nth module, and $X_n$ is the output of the nth module, $W_n$ is any tunable parameters in the nth module, $$\frac{\partial F}{\partial W_n}(W_n, X_{n-1})$$

is the Jacobian of F with respect to W evaluated at the point ($W_n$, $X_{n-1}$), and $$\frac{\partial F}{\partial X}(W_n, X_{n-1})$$

is the Jacobian of F with respect to X.

28. The method according to claim 22, wherein the step e) of adjusting further comprises adjusting some of the tunable parameters in at least one module of the plurality of trainable module, but not all of the tunable parameters in said at least one module.

29. A computerized trainable network for performing a particular function comprising:
- a) means for creating a first graph transformer layer having a first input receiving data structured as a first graph, and a first output outputting data structured as a second graph, wherein the transformer layer uses differentiable functions to produce numerical information in the second graph from numerical information in the first graph and from at least one parameter;
- b) means for creating a second graph transformer layer being coupled to the first graph transformer later, having a second input receiving the second graph, and a second output outputting data structured as a third graph, wherein the second graph transformer layer uses differentiable functions to produce numerical information in the third graph from numerical information in the second graph and from at least one parameter;
- c) means for calculating a first gradient of the particular function with respect to the at least one parameter in the second graph transformer, calculating a second gradient of the particular function with respect to the at least one parameter in the first graph transformer, and modifying the at least one parameter in the first and second graph transformers according to the second and first gradients, respectively, until reaching a minimum value for the particular function; and
- d) means for outputting the minimum value which trains the network to perform the particular function.

30. The network according to claim 29, wherein the first gradient is calculated using the following equations:

$$\frac{\partial E}{\partial W_2} = \frac{\partial F}{\partial W}(W_2, X_1)\frac{\partial E}{\partial X_1}$$

and $$\frac{\partial E}{\partial X_1} = \frac{\partial F}{\partial X}(W_2, X_1)\frac{\partial E}{\partial X_2}$$

where F is a function used by the nth module to convert the second graph input to the second module to the third graph output by the second module, $X_1$ is the data structured as the second graph, and $X_2$ is the data structured as the third graph, $W_2$ is the at least one parameter in the second module, $$\frac{\partial F}{\partial W_2}(W_2, X_1)$$

is the Jacobian of F with respect to W evaluated at the point ($W_2$, $X_1$), and $$\frac{\partial F}{\partial X}(W_2, X_1)$$

is the Jacobian of F with respect to X.

31. The network according to claim 29, wherein the minimum value of the particular function is determined using a gradient based technique.

32. The network according to claim 29, wherein the gradient based technique includes a stochastic gradient descent.

33. The network according to claim 29, wherein the minimum value of the particular function is determined when the particular function stops decreasing significantly.

34. The network according to claim 29, wherein the minimum value of the particular function is determined when the particular function measured on a different set of training examples stops decreasing.

35. The network according to claim 29, wherein the minimum value of the particular function is determined when validation is achieved.

* * * * *